United States Patent
Waters et al.

(10) Patent No.: US 8,223,870 B2
(45) Date of Patent: Jul. 17, 2012

(54) SYSTEMS AND METHODS FOR N-DIMENSIONAL LEAF-NODE PREDICTION FOR MIMO DETECTION

(75) Inventors: Deric Waters, Dallas, TX (US); Anuj Batra, Dallas, TX (US); Srinath Hosur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 916 days.

(21) Appl. No.: 12/048,211

(22) Filed: Mar. 13, 2008

(65) Prior Publication Data

US 2008/0240272 A1 Oct. 2, 2008

Related U.S. Application Data

(60) Provisional application No. 60/908,230, filed on Mar. 27, 2007.

(51) Int. Cl.
*H04L 1/02* (2006.01)
(52) U.S. Cl. ........ 375/267; 375/341; 375/340; 375/262; 714/794
(58) Field of Classification Search ........... 375/267, 375/341, 340, 262; 714/794
See application file for complete search history.

(56) References Cited

U.S. PATENT DOCUMENTS

| | | | |
|---|---|---|---|
| 5,099,235 A | 3/1992 | Crookshanks | |
| 6,026,217 A | 2/2000 | Adiletta | |
| 2003/0012279 A1 | 1/2003 | Chaddha | |
| 2007/0162827 A1* | 7/2007 | Walton et al. | 714/774 |

OTHER PUBLICATIONS

Barry, J. R. et al.; "Digital Communication", 3rd Ed.; 2004; pp. 517-521; Kluwer Academic Publishers.
Foschini, G. J. et al.; "Simplified processing for wireless communication at high spectral efficiency;" IEEE J. Selected Areas in Communication; 1999; pp. 1841-1852; vol. 17, No. 11.
Hochwald, B. M. and ten Brink, S.; "Achieving Near-Capacity on a Multiple-Antenna Channel;" IEEE Trans. on Comm.; Mar. 2003; pp. 389-399; vol. 51, No. 3.
Water, D. W.; "Signal Detection Strategies and Algorithms for Multiple-Input Multiple-Output Channels;" Georgia Institute of Technology; PhD Dissertation; Dec. 2005; available at http://etd.gatech.edu.
Wubben, W. et al.; "Efficient algorithm for decoding layered space-time codes;" Electronic Letters; Oct. 2001; pp. 1348-1350; vol. 37, No. 22.

* cited by examiner

*Primary Examiner* — Chieh M Fan
*Assistant Examiner* — Leila Malek
(74) *Attorney, Agent, or Firm* — Steven A. Shaw; W. James Brady; Frederick J. Telecky, Jr.

(57) ABSTRACT

Embodiments achieve favorable performance-complexity trade-offs in MIMO detection for three or more channel inputs. Some embodiments describe systems and methods comprising a leaf node predictor for receiving a processed communications stream, determining at least one channel metric corresponding to the communications stream for a given channel realization, and generating at least three instructions to output, which at least one instruction corresponds to at least one predicted best leaf node candidate for the given channel realization. Further embodiments alternatively describe systems and methods which enumerate $N_1$ best values of a first symbol, enumerate $N_2(i)$ best values of a second symbol for an i-th best value of the first symbol, enumerate $N_3(i,j)$ best values of a third symbol for an i-th best value of the first symbol and j-th best value of the second symbol, combine enumerated best values of each symbol into a leaf-node value, and compute the cost of each leaf-node value enumerated.

36 Claims, 3 Drawing Sheets

SYSTEMS AND METHODS FOR N-DIMENSIONAL LEAF-NODE PREDICTION FOR MIMO DETECTION

CROSS-REFERENCE TO RELATED APPLICATIONS

The present application claims priority to U.S. provisional patent application Ser. No. 60/908,230 for "N-Dimensional Leaf-Node Prediction for MIMO Detection", hereby incorporated in its entirety herein by reference.

BACKGROUND

As consumer demand for high data rate applications, such as streaming video, expands, technology providers are forced to adopt new technologies to provide the necessary bandwidth. Multiple Input Multiple Output ("MIMO") is an advanced technology that employs multiple transmit antennas and multiple receive antennas to simultaneously transmit multiple parallel data streams. Relative to previous wireless technologies, MIMO enables substantial gains in both system capacity and transmission reliability without requiring an increase in frequency resources.

MIMO systems exploit differences in the paths between transmit and receive antennas to increase data throughput and diversity. As the number of transmit and receive antennas is increased, the capacity of a MIMO channel increases linearly, and the probability of all sub-channels between the transmitter and receiver fading simultaneously decreases exponentially. As might be expected, however, there is a price associated with realization of these benefits. Recovery of transmitted information in a MIMO system becomes increasingly complex with the addition of transmit antennas.

Many multiple-input multiple-output (MIMO) detection algorithms have been previously proposed in the literature. The optimal algorithm is conceptually simple, but is often impractical due to the fact that its complexity increases exponentially with the number of channel inputs. As a result, many algorithms have been proposed to solve the problem with less complexity, with the unfortunate effect of also significantly sacrificing performance.

Many MIMO detectors have been proposed and implemented as exclusively hard detectors that only give the final estimate of the channel input. Most notable is the sphere decoding detector because it can achieve Max-Log performance in an uncoded system with much less complexity on average. A summary of many MIMO detectors may be found in D. W. Waters, "Signal Detection Strategies and Algorithms for multiple-Input Multiple-Output Channels", Georgia Institute of Technology, PhD dissertation, December 2005, including many variations of the sphere detector that minimize complexity without sacrificing performance. One enhancement to a sphere detector is to maintain a list which enables the computation of the so-called log-likelihood ratio (LLR), which ratio provides reliability information for each bit. See, for example, B. Hochwald, S. ten Brink, "Achieving Near-Capacity on a Multiple-Antenna Channel," *IEEE Transactions on Communications, vol.* 51, *no.* 3, *March* 2003, which discusses computing this LLR information using a list-sphere detection approach. Unfortunately, implementing existing MIMO detectors like the list-sphere detector is still quite complex, requiring significant processing resources.

Improvements are desired to achieve a favorable performance-complexity trade-off compared to existing MIMO detectors.

BRIEF DESCRIPTION OF THE DRAWINGS

For a detailed description of exemplary embodiments of the invention, reference will be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a collection of two or more hardware and/or software components, and may be used to refer to an electronic device or devices or a sub-system thereof. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

It should be understood at the outset that although exemplary implementations of embodiments of the disclosure are illustrated below, embodiments may be implemented using any number of techniques, whether currently known or in existence. This disclosure should in no way be limited to the exemplary implementations, drawings, and techniques illustrated below, including the exemplary design and implementation illustrated and described herein, but may be modified within the scope of the appended claims along with their full scope of equivalents.

In light of the foregoing background, embodiments enable improved multiple-input multiple-output (MIMO) detection with a favorable performance-complexity trade-off compared to the Maximum-Likelihood detector and other existing MIMO detectors. It should be appreciated that embodiments of a LNP detector may be used as a way to generate a list of candidate vectors, or its list may be used to directly compute LLR values. It will be further be appreciated by those skilled in the art, that a channel metric indicates whether a channel characteristic is good or bad for channel transmission, i.e., it is hard to perform detection correctly if a channel metric is bad or poor.

Although embodiments will be described for the sake of simplicity with respect to wireless communication systems, it should be appreciated that embodiments are not so limited, and can be employed in a variety of communication systems.

To better understand embodiments of this disclosure, it should be appreciated that the MIMO detection problem—namely, to recover the channel inputs given the channel outputs when there are multiple inputs and outputs—can be described using a narrowband channel model written as:

$$r = H\alpha + w, \quad (1)$$

where H is an M×N channel matrix, $\alpha$ is a signal vector such that $\alpha=[\alpha_1 \, \alpha_2 \ldots \alpha_N]^T$ is an N dimensional vector of symbols that may be drawn from different alphabets, and the noise has the autocorrelation matrix $E[ww^*]=\Sigma^2$. Although the present discussion focuses on the case where $\Sigma^2=I\sigma^2$, it should be understood that embodiments are extendable to the more general case. For example, the channel outputs may be scaled so that the noise components have the same variance, the channel output could be multiplied by $\Sigma^{-1}$; see for example, and not by way of limitation, U.S. patent application Ser. No. 12/022,927 for "Systems and Methods for Scaling to Equalize Noise Variance", hereby incorporated herein by reference. The narrowband channel model can be applied to broadband channels when orthogonal frequency division multiplexing (OFDM) is used. In the OFDM case, each subcarrier is modeled according equation (1). Thus, the algorithms disclosed here can easily be extended to apply to MIMO-OFDM channels.

One way to implement the Max-Log detector uses a QR decomposition of the channel. This decomposition is defined as follows:

$$\begin{bmatrix} H \\ \alpha\hat{\sigma}I \end{bmatrix} \Pi = \begin{bmatrix} Q \\ \alpha\hat{\sigma}\Pi R^{-1} \end{bmatrix} R \quad (2)$$

$$= \tilde{Q}R,$$

where $\tilde{Q}$ is an (M+N)×N matrix with orthonormal columns, R is an N×N triangular matrix with positive and real diagonals, $\Pi$ is an N×N permutation matrix, $\hat{\sigma}$ is an estimate of $\sigma$, and $\alpha$ is a chosen parameter. Although the present discussion describes embodiments assuming a lower triangular R matrix, it should be understood that embodiments can easily be extended to describe an upper triangular matrix instead.

The best value of the parameter a depends on the type of MIMO detector that is used. For example, and not by way of limitation, $\alpha=1$ minimizes the mean squared error (MSE), $\|R^{-1}Q^H y - s\|^2$. On the other hand, $\alpha=0$ is better for the Max-Log receiver. It will be appreciated that in general the parameter a can take on any value.

A permutation matrix is an identity matrix after its columns have been permuted. The way the permutation matrix $\Pi$ is selected impacts performance for some MIMO detectors. For example, and not by way of limitation, BLAST ordering chooses $\Pi$ to maximize the minimum diagonal of R. A less complex way to choose $\Pi$ is the sorted-QR decomposition that attempts to maximize $R_{1,1}$ (lower triangular R). Embodiments of LNP detection can work with any permutation matrix.

Thus, the MIMO detector problem can be simplified by creating an effective channel that is triangular. The process of creating an effective channel that is triangular is called MIMO equalization. One such method of triangularizing a channel uses the conjugate transpose of Q (resulting from the QR decomposition of the channel H) as follows:

$$y = Q^H r = Rs + n \quad (3)$$

where $s = \Pi^{-1}\alpha = [s_1 \, s_2 \ldots s_N]^T$ is a permutation of the channel input vector, n is an effective noise, and the superscript H denotes the conjugate transpose operation. Note that n may be a function of $\alpha$ when $\alpha \neq 0$. The constellation for the i-th symbol is defined as $s_i \in A_i$. The set containing all valid channel inputs is denoted as $A_1^N$, this means $s \in A_1^N$. The set containing all valid values of a subset of the channel inputs is denoted as $A_{N_1}^{N_2}$, this means $[s_{N_1}, s_{N_1+1}, \ldots, s_{N_2}]^T \in A_{N_1}^{N_2}$ where $N_1 \leq N_2$. The set that contains all the elements of any one-dimensional constellation A whose j-th bit have the value k is denoted as $A(k,j)$. For example, $A_i(k,j)$ is the set of all valid values of $s_i$ whose j-th bit have the value k. The set that contains all the elements of any multi-dimensional constellation $A_{N_1}^{N_2}$ whose j-th bit in the i-th symbol have the value k is denoted as $A_{N_1}^{N_2}(k,i,j)$. For example, $A_1^N(k,i,j)$ is the set of all valid values of s whose j-th bit in the i-th symbol maps to the value k.

Other MIMO equalization techniques that do not use QR decomposition may also be used. For example, methods based on the Cholesky decomposition of H do not require the computation of Q. The Cholesky decomposition can compute R without computing Q. The equalization output in this case may be computed as:

$$y = R^{-1}H^H r = Rs + n \quad (4)$$

The output of a Max-Log detector is the log-likelihood ratio (LLR) of each bit transmitted in the vector s. The LLR value indicates the probability that a given bit was transmitted as a one or zero. The Max-Log detector output for the j-th bit of the i-th symbol is described by a single equation:

$$\lambda_{i,j} = (\|r - H\Pi s^{(o)}\|^2 - \|r - H\Pi s^{(1)}\|^2)/\hat{\sigma}^2, \quad (5)$$

where $\|r - H\Pi s^{(k)}\|^2$ is minimized under the constraint that $s^{(k)} \in A_1^N(k,i,j)$. It should be understood that this is only one example of how an LLR may be computed, and should not be used as a limitation on the embodiments disclosed or invention claimed. Also, the value $\|r - H\Pi x\|^2$ is defined as the mean-squared error (MSE) of the vector x. The mean-squared error is one kind of cost that can be used for processing the signal.

The Max-Log detector may also be defined using the equivalent triangular channel model:

$$\lambda_{i,j} = (\|y - Rs^{(o)}\|^2 - \|y - Rs^{(1)}\|^2)/\hat{\sigma}^2, \quad (6)$$

where $\|y - Rs^{(k)}\|^2$ is minimized subject to the constraints $s^{(k)} \in A_1^N(k,i,j)$, and $\alpha=0$, and where $\Pi$ can be any permutation matrix. Note that $\|y - Rx\|^2 = \|r - H\Pi x\|^2$ when $\alpha=0$.

Many MIMO detectors are classified as list detectors. A list detector is any detector that generates a list of candidate vectors for the channel input. The set of candidate vectors is labeled as the set $L$ and the number of candidates in the set is called the list length L. The Max-Log detector is a list detector with an exhaustive list. It is desirable for list detectors to generate their lists to be as small as possible without sacrificing too much performance.

Given the set L generated by any list detector, the LLR for the j-th bit of the i-th symbol may be computed in a manner similar to the Max-Log detector in (5) and (6):

$$\lambda_{i,j} = (\|y - Rs^{(o)}\|^2 - \|y - Rs^{(1)}\|^2)/\hat{\sigma}^2, \quad (7)$$

where $\|y - Rs^{(k)}\|$ is minimized subject to the constraints $s^{(k)} \in A_1^N(k,i,j)$ and $s^{(k)} \in L$. Note that here $\alpha=0$ is not required, and $\Pi$ can be any N×N permutation matrix.

An important problem for MIMO detection is finding the vector $\hat{\alpha}$ that maximizes $Pr[y|\alpha = \hat{\alpha}]$. This can be written as:

$$Pr[y|s\hat{s}] = \min_{s \in A_d^N} \|y - R\hat{s}\|^2,$$

where $A_1^N$ is set of all possible channel inputs. Therefore, minimizing the quantity $\|y - R\hat{\alpha}\|^2$ over a range of possible values for the vector $\hat{\alpha}$ is an important challenge for MIMO detection. This detection challenge is directly related to the probability $Pr[y|\alpha=\hat{\alpha}]$, which can be fully described in terms of a tree search. The number of branches exiting the root node corresponds to the number of possible values for the first symbol. Likewise the number of branches exiting the nodes preceding the i-th level corresponds to the number of possibilities for the i-th symbol. In the end, there are $$\prod_{i=1}^{N}|A_i|$$

total leaf nodes in the tree. The "cost" of any node is the sum of the scores of all the branches in the path back to the root node, where every branch in the tree is associated with a unique score. The score of a branch exiting a node at the i-th level can be written as:

$$Score \leq |z_i - R_{i,i}\hat{s}_i|^2,$$

where $z_i$ is the result of an interference cancellation procedure. The interference cancellation procedure is defined as:

$$z_i = y_i - \sum_{j=1}^{i-1} R_{i,j}\hat{s}_j, \quad (8)$$

where $y_i$ is defined by equation (4), and $[\hat{s}_1 \ldots \hat{s}_{i-1}]^T$ are the symbols from the path that connects the current branch back to the root node.

Figure 1:
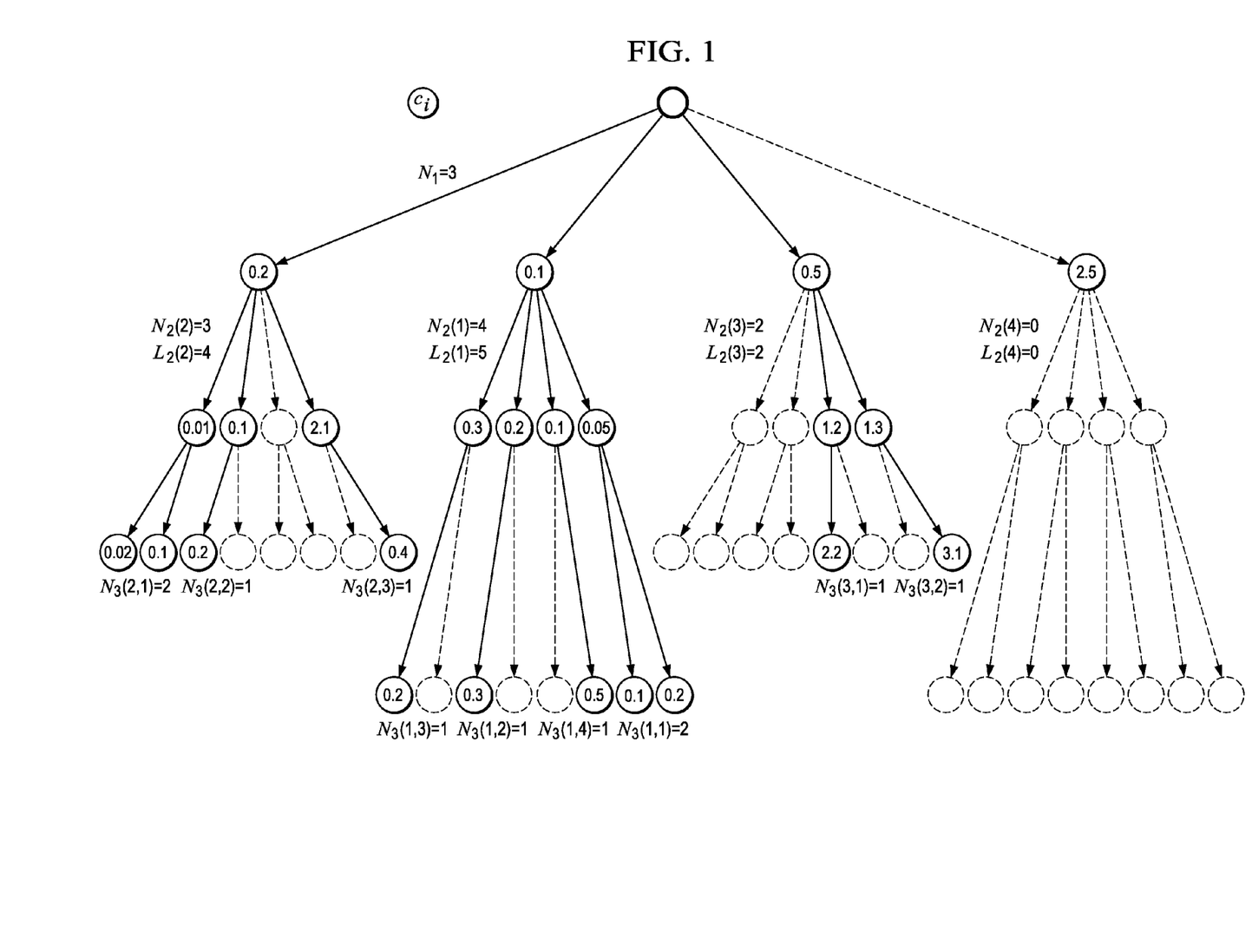
FIG. 1 illustrates an example tree diagram of branches enumerated by a Leaf-Node Prediction ("LNP") detector in which embodiments may be used to advantage.

FIG. 1 gives an example tree with three levels (N=3) and four branches exiting each node in the first two levels and two branches exiting each node at the third level ($A_1$ and $A_2$ contain four elements; and $A_3$ contains two elements). The branches illustrated were enumerated by an exemplary embodiment of a LNP detector that will be discussed later.

Figure 2:
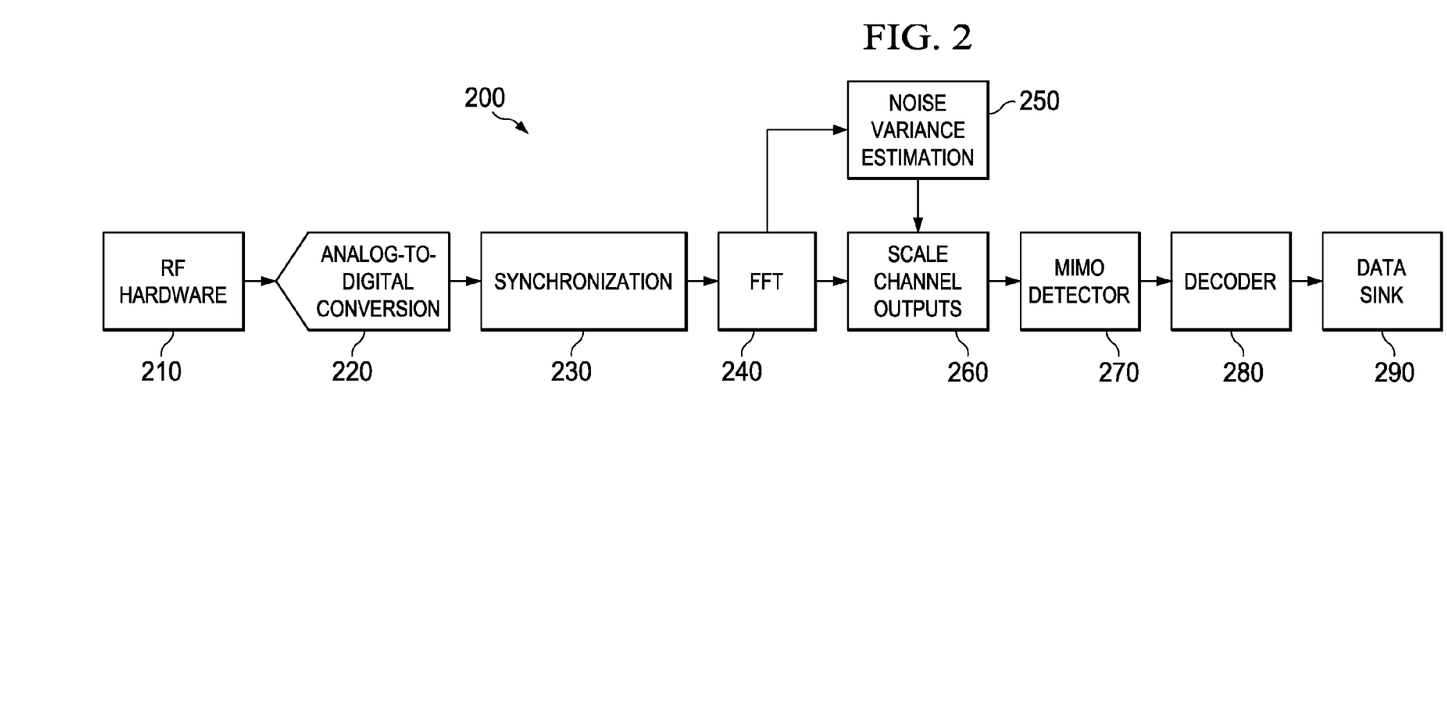
FIG. 2 illustrates a block diagram of an exemplary communication system comprising an exemplary MIMO detector.

FIG. 2 is a block diagram of an exemplary communication system comprising a MIMO detector. Specifically, a wireless (e.g., radio frequency) stream of information is received at RF hardware 210, converted to a digital stream at analog-to-digital converter 220, and synchronized at 230. At this point the start of the packet has been located, and the digital stream is passed through a fast-Fourier transformation at FFT 240. The output of FFT 240 is provided to estimator 250 which estimates the noise variance of the stream. The outputs of FFT 240 and estimator 250 are provided to scaler 260 where the channel stream is preferably scaled using the noise variance estimation on the transformed stream, and separated into components. For an example, and not by way of limitation, of a scaler 260, reference is made to "Scaling to Reduce Wireless Signal Detection Complexity", U.S. patent application Ser. No. 11/928,050, filed Oct. 30, 2007, hereby incorporated in its entirety herein by reference. The outputs of scaler 260 are preferably fed to channel estimator 265 which estimates the H matrix. Scaler 260 forwards channel outputs, r, and channel estimator 265 forwards the estimated H matrix or matrices to MIMO detector 270. MIMO detector 270, which will be described as comprising a LNP detector for portions of this discussion, generates LLR values which are in turn provided to decoder 280 for analysis and/or further processing. The output of decoder 280 is stored in data sink 290 which can be any form of memory now known or later developed.

It will be appreciated that application of a low-complexity leaf-node predictor is motivated by the fact that a list-sphere detector has excellent performance even with very small L. Unfortunately, the list-sphere detector requires high complexity to generate even a small list. The implication is that for a given channel realization, if the receiver knew beforehand which L leaf nodes had minimum cost then the MIMO detection problem solves with very low complexity. This is the goal of embodiments of a leaf-node predictor. Thus, embodiments predict the best candidates for the channel inputs and disregard other possible channel inputs to reduce complexity.

Figure 3:
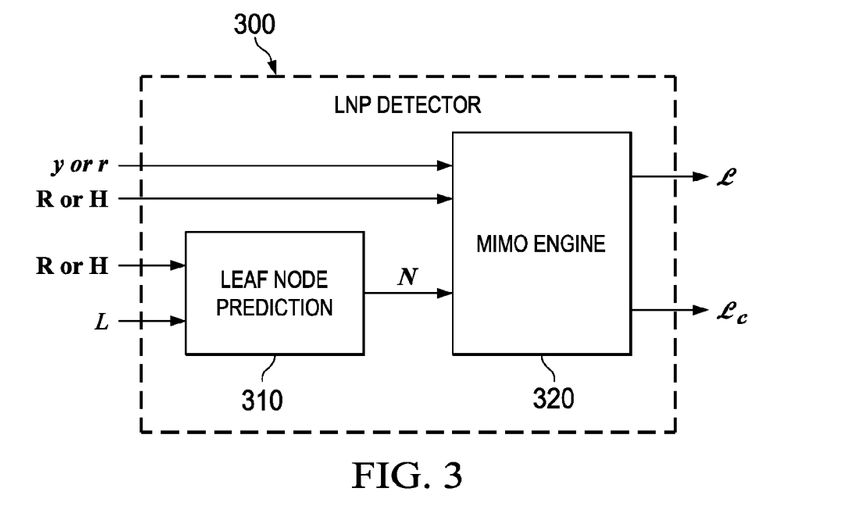
FIG. 3 shows a block diagram of an exemplary LNP detector in which embodiments may be used to advantage.

An LNP detector 300, consistent with embodiments, comprises at least two elements as illustrated in FIG. 3; namely, leaf node predictor 310 and MIMO engine 320. Leaf node predictor 310 predicts the best leaf nodes for a given channel realization—this is also sometimes referred to in this disclosure as Leaf-Node Prediction. MIMO engine 320 uses instructions received from leaf node predictor 310 as to which leaf nodes to enumerate to output the set of predicted leaf nodes along with their costs. It should be understood that instructions are also sometimes referred to in the field as parameters, but should not be confused with what will be referred to as parameters in the present disclosure. As such, embodiments may comprise a portion of a MIMO detector within a receiver (e.g., FIG. 2), or embodiments may be employed as a new variety of list detector to be used in any applicable system. Predicting the best leaf nodes for a given channel realization enables LNP detector 300 to approach the performance of the list-sphere detector, but with less complexity.

The ability of the leaf-node predictor to accurately predict the best leaf nodes for a given channel realization is key for LNP detector 300 to achieve good performance with a small list length. It should be appreciated that the phrases leaf nodes, leaf node values, and leaf node candidates may be used interchangeably throughout this disclosure. In U.S. patent application Ser. No. 12/016,921 for "Systems and Methods for Low-Complexity MIMO Detection Using Leaf-Node Prediction via Look-Up Tables" and U.S. patent application Ser. No. 12/016,967 for "Systems and Methods for Low-Complexity MIMO Detection with Analytical Leaf-Node Prediction", systems and methods of leaf-node prediction were implemented for two-dimensional channels. One of the disclosed leaf-node prediction techniques used a pre-computed look-up table of instructions. A second disclosed leaf-node predictor, predicted the best leaf nodes as needed in real-time using analytical leaf-node prediction. Both of these leaf-node predictors were based on computing a channel metric which measured the relative robustness of the two channel inputs to errors. This relative robustness was then used by the leaf-node predictor. The embodiments discussed herein improve upon previous leaf-node predictors to enable leaf-node prediction for channels with three or more channel inputs.

Embodiments of LNP detector 300, according to the present disclosure, can stand alone as an N-dimensional list generator, as an N-dimensional MIMO detector, or may be combined with a candidate list generation and interference cancellation (CLIC) framework to implement an (N+1)-dimensional MIMO detector. For at least one example of a CLIC framework, and not by way of limitation, reference is made to "Candidate List Generation and Interference Cancellation Framework for MIMO Detection", U.S. patent application Ser. No. 11/930,259, filed Oct. 31, 2007, hereby incorporated in its entirety herein by reference, in which the CLIC framework is employed to convert an N-dimensional vector enumerator (sometimes called a list detector) into an (N+1)-dimensional MIMO detector. As described herein, embodiments of LNP detector 300 may be used as a way to generate a list of candidate vectors, or its list may be used to directly compute LLR values.

In order to implement leaf-node prediction on a channel with N>2, novel channel metrics are employed. Below are two examples, and not by way of limitation:

1. $m_i = \left( \dfrac{R_{i,i}^q}{\min_{k=i+1...N}(R_{k,k}^q)} \right)^p$

2. $m_i = \left( \dfrac{\|\tilde{h}_i\|^q}{\min_{k=i+1...N}(\|\tilde{h}_k\|^q)} \right)^p$, where $\tilde{h}_k$ is the k-th column of HΠ. The values of p and q are preferably selected by the designer to minimize complexity. For example, q=1 and p=2 or q=2 and p=1 are common choices. The value of p and/or q could also be chosen to be negative. Both these channel metrics measure the relative robustness between the i-th symbol and the (i+1)th through Nth symbols, and use the resulting measurement to determine the amount of resources to assign to the i-th symbol. It should also be understood that a leaf node predictor may generate at least one instruction to output by optimizing a probability that the output contains at least a suitable approximation of a channel input with lowest cost or alternatively generates at least one instruction to output by optimizing a probability that the output contains the channel input with lowest mean-squared error.

Some embodiments of higher-dimensional leaf-node predictors assume access to a two-dimensional leaf-node predictor defined as:

$$[N_1, N_2(:)] = \text{LNP}_2(m, L), \quad (9)$$

where m is the channel metric, for example $$m = \dfrac{R_{1,1}}{R_{2,2}},$$

is the list length, and the notation $N_2(:)$ indicates a vector where $N_2(:)=[N_2(1)\ N_2(2)\ldots N_2(N_1)]$. Such embodiments of higher-dimensional leaf-node prediction build upon a two-dimensional leaf-node predictor to implement higher-dimensional leaf-node prediction. In such embodiments, any two-dimensional leaf-node predictor may be used; specific examples, without limitation, may be found in U.S. patent application Ser. No. 12/016,921 for "Systems and Methods for Low-Complexity MIMO Detection Using Leaf-Node Prediction via Look-Up Tables" and U.S. patent application Ser. No. 12/016,967 for "Systems and Methods for Low-Complexity MIMO Detection with Analytical Leaf-Node Prediction", both hereby incorporated herein.

The number of leaf nodes that embodiments of LNP detector 300 enumerate is an input parameter called the list length, denoted as L. Solely as an example, and not by way of limitation, $$N = 3, L = \sum_{i=1}^{N_1} N_2(i).$$

The list length impacts both the performance and complexity of a LNP detector, and should be carefully chosen. Preferably, the Leaf-Node Prediction block of the LNP detector outputs the MIMO engine instructions, which yield the best performance under the constraint that no more than L leaf nodes are enumerated. The list length can be viewed as the number of resources the receiver has from which to form the best estimate of the channel inputs. Embodiments of leaf-node predictor decide how best to distribute these resources. Another example of a method for distributing fixed resources in a MIMO-OFDM system is described in patent application Ser. No. 11/926,966 for "Dynamic Resource Allocation to Improve MIMO Detection Performance", hereby incorporated by reference herein.

It has been discovered that an N-dimensional problem (N>2) can be broken down into multiple two-dimensional problems. First, the resources are divided between the first symbol and the rest of the symbols.

$$[N_1, L_2(:)] = \text{LNP}_2(m_1, L), \quad (10)$$

where $L_2(:)=[L_2(1)\ L_2(2)\ldots L_2(N_1)]$ are the number of leaf nodes to enumerate for each candidate of the first symbol, and where $m_1$ is the channel metric of choice, for example $$m_1 = \dfrac{R_{1,1}}{\min_{k=2...N}(R_{k,k})}.$$

Referring back to FIG. 1, each of the $N_1$ candidates for the first symbol spawns a new subtree containing N−1 levels. At this point, the resources have been allocated to each of these subtrees. Namely, $L_2(i)$ leaf nodes will be enumerated from the subtree corresponding to the branch with the i-th smallest cost at the first level of the tree.

In each of the $N_1$ subtrees spawned from the candidates for the first symbol, the resources are again divided between the first symbol in the subtree and the rest of the symbols. Specifically, for i=1 to $N_1$:

$$[N_2(i), L_2(i,:)] = \text{LNP}_2(m_2, L_2(i)) \quad (11)$$

where $N_2(i)$ is the number of leaf nodes to enumerate for each candidate of the first symbol in the i-th subtree, $L_3(i,:)=[L_3(i,1)\ L_3(i,2)\ldots L_3(i,N_2(i))]$ and $L_3(i,j)$ is the number of leaf nodes to enumerate that include the i-th best value of the first symbol and the j-th best value for the second symbol, and where $m_2$ is the channel metric of choice, for example $$m_2 = \dfrac{R_{2,2}}{\min_{k=3...N}(R_{k,k})}.$$

If N=3, the leaf-node prediction stops here and $N_3=L_3$. For a higher-dimensional problem (N>3), the process of recursively dividing remaining resources among the different symbols continues in like manner. Specifically, for i=1 to $N_1$ and for j=1 to $N_2(i)$ the two-dimensional leaf-node predictor is called:

$$[N_3(i,j), L_4(i,j,:)] = \text{LNP}_2(m_3, L_3(i,j)).$$

In the end, the final instructions given to the MIMO engine are contained in $N_1, N_2, \ldots N_N$.

To make the process more clear consider the specific example shown in FIG. 1. As a first step, the relative resource allocation between the first symbol and the rest of the symbols is computed. Assume a two-dimensional leaf-node predictor gives the following results (refer to equation (10)):

$$[3, [5\ 4\ 2\ 0]] = \text{LNP}_2(m_1, 11), N_1 = 3 \text{ and } L_2(:) = [5\ 4\ 2\ 0].$$

This means that three sub-trees are spawned from the first-level of the tree (shown as solid lines in FIG. 1). Next, for each of these sub-trees the two-dimensional leaf-node predictor is implemented again:

[4,[2 1 1 1]]=LNP$_2$($m_2$,5), $N_2$(1)=4 and $L_3$(1,:)=[2 1 1 1]

[3,[2 1 1 0]]=LNP$_2$($m_2$,4), $N_2$(2)=3 and $L_3$(2,:)=[2 1 1 0]

[2,[1 1 0 0]]=LNP$_2$($m_2$,2), $N_2$(3)=2 and $L_3$(3,:)=[1 1 0 0].

$N_3 = L_3$

The MIMO engine is told to:
1. Enumerate the $N_1$=3 best values of symbol one,
2. For the i-th best value of symbol one, enumerate the $N_2$(i) best values of symbol two.
3. For the i-th best value of symbol one, and the j-th best value for symbol two enumerate the $N_3$(i,j) best values of symbol three. Each enumeration produces a leaf-node.
4. Compute the cost of each enumerated leaf-node.

Perhaps another way of looking at embodiments would be to understand that the job of leaf-node predictor 310 is to generate the instructions N={$N_1$ $N_2$ ... $N_N$} for a given list length and channel matrix. The goal of embodiments of the leaf-node predictor is to ensure that the actual channel input is one of the vectors in the output list $\underline{L}$. Each of the symbols in the channel input s as defined in equation (4) has a different probability of causing an error—an error means that the actual channel input is not in the list $\underline{L}$. Since an error can be caused when any symbol is wrong, minimizing the probability of an error means equalizing the probability that each symbol causes an error so that they are equally or approximately equally robust to errors. In channels where the first symbol is more prone to error, $N_1$ preferably should be larger because enumerating more values of the first symbol will make it more robust to errors. Leaf-node predictor 310 employs a channel metric generated from the channel matrix that measures the relative robustness to errors of the N symbols. Such a channel metric preferably indicates how many candidates for each symbol are to be enumerated so all symbols are equally robust to errors. Note that changing the parameters α, Π, or $\hat{\sigma}$ used to implement equation (2) may also change this channel metric, which may be used to advantage. For example, by choosing the Π that minimizes or maximizes the value of h(H) the range of values of the channel metric stored in a parameter look-up table can be reduced.

Consider now MIMO engine 320. There are at least two different embodiments of this MIMO engine; some of which are when a triangular matrix R is input, and some of which are when a full matrix H is input. In the following discussion, the MIMO engine is defined as having the matrix R is input. Later in this disclosure embodiments are considered where the MIMO engine is defined when the matrix H is input. Note that any MIMO engine 320 embodiment that currently exists or is developed in the future can be coupled to the leaf-node predictor 310; it is preferred that it take the inputs N={$N_1$ $N_2$ ... $N_N$}, and compute a list L and the cost of each of the L elements in the list L.

First consider embodiments of MIMO engine 320 when a triangular matrix R is input along with the MIMO equalizer output y (refer to equations (3) and (4)). Embodiments of MIMO engine 320 may be implemented by a tree-search engine. There are N instructions that are input into the MIMO detector engine. For simplicity, embodiments where N=3 will be discussed, however such embodiments can also handle more dimensions. The first instruction is $N_1$, and MIMO detector engine 320 enumerates the $N_1$ best symbol values for the first symbol. The second instruction is the vector $N_2$(:)= [$N_2$(1) $N_2$(2) ... $N_2$($N_1$)], and MIMO engine 320 enumerates the $N_2$(i) best symbol values for the i-th best value of the first symbol. The third instruction is the matrix, or set of vectors, $N_3$,(:,:):

$$N_3(:,:) = \begin{bmatrix} N_3(1,1) & N_3(1,2) & \ldots & \ldots & N_3(1, N_2(1)) \\ N_3(2,1) & N_3(2,2) & \ldots & N_3(2, N_2(2)) & 0 \\ \vdots & \vdots & \ldots & \vdots & \vdots \\ N_3(N_1,1) & N_3(N_1,2) & \ldots & N_3(N_1, N_2(N_1)) & 0 \end{bmatrix}, \quad (14)$$

and MIMO detector engine 320 enumerates the $N_3$(i,j) best symbol values when the first two symbols are the i-th and j-th best values of the first and second symbol, respectively. There is another instruction added for each additional dimension and N refers to all instructions taken together N={$N_1$ $N_2$ ... $N_N$}. In some cases, it is possible to infer the instruction $N_i$ from $N_j$ (j>i). For example, $N_1$ is the number of non-zero elements in $N_2$(:), or $N_1$ could be the number of non-zero elements in $N_3$(:,1) and $N_2$(i) could be the number of non-zero elements in $N_3$(i,:)

It should be understood that the number of non-zero elements in each row of the matrix $N_3$(:,:) need not be the same. Generally, the number of non-zero elements in the (j+1)-th row is not greater than the number in the j-th row, however this is a general rule, not a requirement. In fact, for example, all rows may have the same number of non-zero elements. It is preferable that the elements of matrix $N_3$(:,:) be integers whose sum does not exceed the list length of the detector:

$$L \leq \sum_{i=1}^{N_1} \sum_{j=1}^{N_2(i)} N_3(i,j).$$

Specifically, for example, the instructions input into MIMO engine 320 from embodiments of LNP 310 are in the form of three (3) instructions. The first instruction is an integer $N_1$ which instructs MIMO engine 320 to enumerate the $N_1$ best symbol values for the first symbol $s_1$ and compute the score of each value. MIMO engine 320 thus computes Score$_{1,i}$=|y$_1$−R$_{1,1}\hat{s}_{1,i}$|$^2$ for i=1 to $N_1$, where $\hat{s}_{1,i}$ is the i-th best estimate of $s_1$. The second instruction input into MIMO engine 320 is a set of integers $N_2$(:), which instructs MIMO engine 320 to enumerate the $N_2$(i) best symbol values for the second symbol $s_2$ assuming that $s_1$=$\hat{s}_{1,i}$. Therefore, MIMO engine 320 computes Score$_{2,i,j}$=|y$_2$−R$_{2,1}\hat{s}_{1,i}$−R$_{2,2}\hat{s}_{2,i,j}$|$^2$ for i=1 to $N_1$ and for j=1 to $N_2$(i), where $\hat{s}_{2,i,j}$ is the j-th best estimate of $s_2$ assuming $s_1$=$\hat{s}_{1,i}$. The third instruction input into MIMO engine 320 is a set of vectors $N_3$(:,:) which instructs MIMO engine 320 to enumerate the $N_3$(i,j) best symbol values for the third symbol $s_3$ assuming that $s_1$=$\hat{s}_{1,i}$ and $s_2$=$\hat{s}_{2,i,j}$. Therefore, MIMO engine 320 computes Score$_{3,i,j,k}$=|y$_3$−R$_{3,1}\hat{s}_{1,i}$−R$_{3,2}\hat{s}_{2,i,j}$−R$_{3,3}\hat{s}_{3,i,j,k}$|$^2$ for i=1 to $N_1$, for j=1 to $N_2$(i), (where $\hat{s}_{2,i,j}$ is the j-th best estimate of $s_2$ assuming $s_1$=$\hat{s}_{1,i}$) and for k=1 to $N_3$(i,j), (where $\hat{s}_{3,i,j,k}$ is the k-th best estimate of $s_3$ assuming that $s_1$=$\hat{s}_{1,i}$ and $s_2$=$\hat{s}_{2,i,j}$). The final outputs of MIMO engine 320 are the set of costs, $L_c=\{score_{1,i}+Score_{2,i,j}+Score_{3,i,j,k}\}$, and the set of $$\text{enumerated possible channel inputs } \mathcal{L} = \left\{ \begin{bmatrix} \hat{s}_{1,i} \\ \hat{s}_{2,i,j} \\ \hat{s}_{3,i,j,k} \end{bmatrix} \right\}.$$

MIMO engine 320 uses a constellation-sorting function to decide on the i-th best candidate for a given symbol. In tree-search terminology, this is the same as computing the i-th best branch exiting a given node. Continuing with the example of FIG. 1, strictly for illustration and not by way of limitation, MIMO engine 320 of LNP detector 300 can use any constellation-sorting function to determine the $N_1$, $N_2(i)$ or $N_3(i,j)$ best branches (or symbols) to enumerate from a given node in the tree. For an example, and not by way of limitation, of a constellation-sorting function, reference is made to "Candidate Generation", U.S. patent application Ser. No. 11/926,625, filed Oct. 29, 2007, hereby incorporated in its entirety herein by reference. A generic function to represent this sorting operation is preferably defined:

$$f(y,R,A,i)=\text{i-th best candidate from the alphabet } A. \quad (15)$$

There are many ways to implement this sorting operation, and LNP detector 300 will work with any of them—even suboptimal sorting operations. Another, and possibly more intuitive, way of expressing equation (15) would be:

$$f(y,R,A,i)=\text{i-th nearest symbol to } y/R \text{ in } A. \quad (16)$$

The i-th best candidate for the first symbol is therefore expressed as $f(y_1,R_{1,1},A_1,i)$.

For the i-th candidate of the first symbol, and the j-th candidate of the second symbol, MIMO engine 320 computes the cost of the leaf nodes corresponding to the $N_3(i,j)$ best values of the third symbol. This computation preferably employs interference cancellation that assumes that the i-th candidate for the first symbol and the j-th candidate for the second symbol are the actual channel inputs. The result of this interference cancellation is defined in equation (8). For the N=3 special case, the interference cancellation result can be written as:

$$z_3 = y_3 - \sum_{i=1}^{N-1} R_{3,i}\hat{s}_i. \quad (17)$$

The k-th best candidate for the third symbol, when the candidate for the first and second symbols are $\hat{s}_1$ and $\hat{s}_2$, respectively, is preferably computed using the constellation sorting function $\hat{s}_3(k)=f(z_3, R_{3,3}, A_3, k)$. The j-th best candidate for the second symbol, when the candidate for the first symbol is $\hat{s}_1$ is preferably computed using the constellation sorting function $\hat{s}_2=f(y_2-R_{2,1}\hat{s}_1, R_{2,2}, A_2, j)$.

One output of MIMO engine 320 is a list of candidate vectors, L, which correspond to the leaf nodes specified by the input instructions N. Another output is the cost of each of the candidate vectors in the output list, the list of costs is labeled as $L_c$. Return momentarily to the example tree diagram of FIG. 1, with $A_1=A_2=$4-QAM, $A_3=$BPSK and L=11. The leaf-node prediction results in this case are $N_1=3$, $N_2(:)=[4\ 3\ 2\ 0]$, and $$N_3(:,:) = \begin{bmatrix} 2 & 1 & 1 & 1 \\ 2 & 1 & 1 & 0 \\ 1 & 1 & 0 & 0 \\ 0 & 0 & 0 & 0 \end{bmatrix}. \quad (18)$$

The leaf nodes (branches) that are enumerated in the illustrated example are indicated with solid lines, while those branches that are not enumerated are indicated with dashed lines. The last row containing all zeros is only shown for illustrative purposes, $N_3(:,:)$ could be defined not to include this row.

The score of a particular symbol can be defined in multiple ways. We use a generic function to represent this operation:

$$g(y,R,\hat{s})=\text{score of the symbol } \hat{s} \quad (19)$$

The most obvious definition of this function is the mean-squared error:

$$g(y,R,\hat{s})=|y-R\hat{s}|^2. \quad (20)$$

Other possible definitions include approximations of the above definition that may be less complex to compute, as well as mathematically equivalent expressions that may be less complex to compute. One such approximation is to use the absolute value instead of the absolute value squared. It is also possible to use a correlation-based score computation.

For a generic set of input instructions $N=\{N_1\ N_2\ \ldots\ N_N\}$, embodiments of MIMO engine 320 can be described by the following exemplary pseudocode. It will be appreciated by one skilled in the art that such exemplary pseudocode is provided strictly as an example, and not by way of limitation, as it can be rewritten with different pseudocode that is functionally equivalent. It should be further appreciated that MIMO engine 320 as modeled by this pseudocode may alternatively be implemented using hardware, or a combination of hardware and software. Furthermore, it should be appreciated that, while the special case of N=3 is shown, this pseudocode can be easily adapted to any value of N.

| MIMO Engine (Given R and y): |
| --- |
| 1.    for i = 1 to $N_1$ |
| 2.        $\hat{s}_1 = f(y_1, R_{1,1}, A_1, i)$ |
| 3.        $z_2 = y_2 - R_{2,1}\hat{s}_1$ |
| 4.        Compute the score of $\hat{s}_1$, $c_1 = g(y_1, R_{1,1}, \hat{s}_1)$. |
| 5.        for j = 1 to $N_2(i)$ |
| 6.            $\hat{s}_2 = f(z_2, R_{2,2}, A_2, j)$ |
| 7.            $z_3 = y_3 - R_{3,2}\hat{s}_2 - R_{3,1}\hat{s}_1$ |
| 8.            Compute the score of $\hat{s}_2$, $c_2 = g(z_2, R_{2,2}, \hat{s}_2)$. |
| 9.            for k = 1 to $N_3(i, j)$ |
| 10.                $\hat{s}_3 = f(z_3, R_{3,3}, A_3, k)$ |
| 11.                Compute the score of $\hat{s}_3$, $c_3 = g(z_3, R_{3,3}, \hat{s}_3)$. |
| 12.                Add the candidate vector $\begin{bmatrix} \hat{s}_1 \\ \hat{s}_2 \\ \hat{s}_3 \end{bmatrix}$ to the list $L$. |
| 13.                Add the cost of the candidate vector $c = c_1 + c_2 + c_3$, to the set of output costs $L_c$. |
| 14.           end |
| 15.        end |
| 16.    end |

Now consider embodiments of MIMO engine 320 when a full matrix H is input along with the channel output r. In this case, MIMO engine 320 operates differently. Specifically, the cost computation is not separated into multiple score computations. Instead each candidate in the list is constructed, and then its cost is directly computed. Otherwise, MIMO engine 320 operates very much as previously described. The following pseudocode gives an example of one way the MIMO engine may operate when it is given H and r.

| MIMO Engine (Given H and r): |
| --- |
| 1. $y_1$ = first output of linear filter, for example $y_1$ may be the first element in the vector y, where $y = \tilde{H}^+ r$, where the $^+$ operator applied to any matrix A indicates the following $A^+ = (A^H A + \alpha^2 \sigma^2 I)^{-1} A^H$, and where $\tilde{H} = H\Pi = [\tilde{h}_1 \ \tilde{h}_2 \ \ldots \ \tilde{h}_N]$. |
| 2.   for i = 1 to $N_1$ |
| 3.     $\hat{s}_1 = f(y_1, 1, A_1, i)$ |
| 4.     $z_1 = f_1(r - \tilde{h}_1 \hat{s}_1)$ where $f_1$ is the first row of the matrix $F = (\tilde{H}(:, 2:N))^+$. This is a form of interference cancellation. |
| 5.     for j = 1 to $N_2(i)$ |
| 6.       $\hat{s}_2 = f(z_1, 1, A_2, j)$ |
| 7.       $z_2 = f_2(r - \tilde{h}_1 \hat{s}_1 - \tilde{h}_2 \hat{s}_2)$ where $f_2$ is the first row of the matrix $F = (\tilde{H}(:, 3:N))^+$ |
| 8.       for k = 1 to $N_3(i, j)$ |
| 6.         $\hat{s}_3 = f(z_2, 1, A_3, k)$ |
| 9.         Add the candidate vector $\hat{s} = \begin{bmatrix} \hat{s}_1 \\ \hat{s}_2 \\ \hat{s}_3 \end{bmatrix}$ to the list $\underline{L}$. |
| 10.         Compute the cost of the candidate vector: $c = g(r, H, \hat{s})$, where $c = g(r, \tilde{H}, \hat{s})$ is preferably defined as $g(r, \tilde{H}, \hat{s}) = \|r - \tilde{H}\hat{s}\|^2$. |
| 11.         Add the cost of the candidate vector c, to the set of output costs $\underline{L}_c$. |
| 12.       end |
| 13.     end |
| 14.   end |

In the above pseudocode, the linear filter definition indicated with the $^+$ operator is only one example of a linear filter that may be used. It should be understood that although each of the above pseudocode embodiments is for the case where N=3, for embodiments where N>3, the implementation is similar. Namely, each additional symbol leads to another nested for-loop iteration in the respective pseudocode. Further it should be appreciated that although the pseudocode describes the leaf-node predictor in a serial fashion, it lends itself to a parallel implementation as well.

Figure 4:
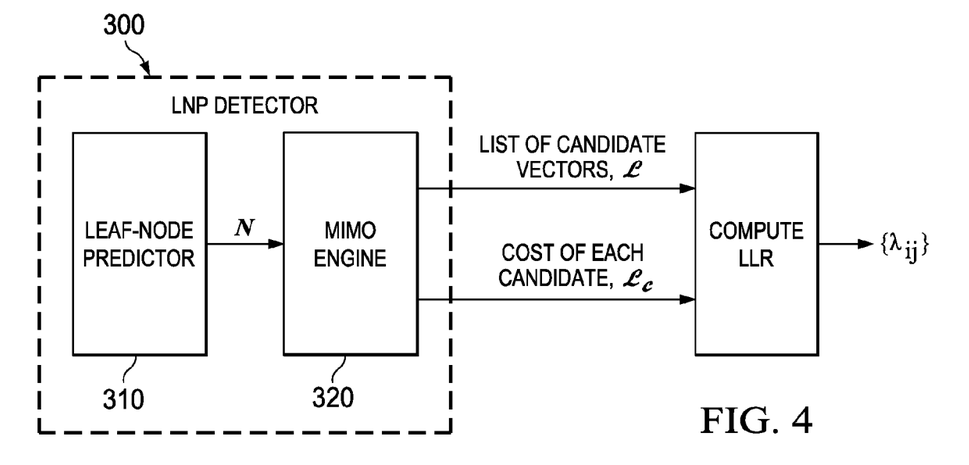
FIG. 4 illustrates a block diagram of an exemplary LNP detector, for computing LLR values, in which embodiments may be used to advantage.

MIMO engine 320 and leaf-node predictor 310 together make up the LNP detector 300. In one embodiment, such as that illustrated in the block diagram of FIG. 4, the outputs from MIMO engine 320 could be used to compute the log-likelihood ratio (LLR) values of each bit. Leaf node predictor 310 provides instructions to MIMO engine 320, which in turn generates a list of candidate vectors $\underline{L}$ and a list of the cost of each corresponding candidate $\underline{L}_c$. These outputs are used to compute LLR values; this is a preferable embodiment for MIMO channels with N inputs, where N is greater than or equal to 2. In another embodiment, the MIMO detector that is processing a channel with more than N inputs, where N is greater than or equal to 2, may use embodiments of the LNP detector to generate one or more lists of N-dimensional candidate vectors, which can then be used to implement a MIMO detector for a channel with more than N inputs. For an example, and not by way of limitation, reference is made to "Candidate List Generation and Interference Cancellation Framework for MIMO Detection", U.S. patent application Ser. No. 11/930,259, filed Oct. 31, 2007, hereby incorporated in its entirety herein by reference, of one way to solve an (N+1)-dimensional MIMO detection problem. In general, the outputs $\underline{L}$ and $\underline{L}_c$ could alternatively be inputs to another functional block for further processing.

Many modifications and other embodiments of the invention will come to mind to one skilled in the art to which this invention pertains having the benefit of the teachings presented in the foregoing descriptions, and the associated drawings. Therefore, the above discussion is meant to be illustrative of the principles and various embodiments of the disclosure; it is to be understood that the invention is not to be limited to the specific embodiments disclosed. Although specific terms are employed herein, they are used in a generic and descriptive sense only and not for purposes of limitation. It is intended that the following claims be interpreted to embrace all such variations and modifications.

What is claimed is:

1. A multiple-input multiple-output (MIMO) detection system, comprising:
a leaf node predictor for receiving a processed communications stream, determining at least one channel metric, which is a function of a matrix, corresponding to the communications stream for a given channel realization, and generating at least three instructions to output including at least one vector, wherein the leaf node predictor determines the at least one channel metric, $m_i$, such that $$m_i = \left( \frac{R_{i,i}^q}{\min_{k=i+1\ldots N}(R_{k,k}^q)} \right)^p,$$

where R is an N×N triangular matrix with positive and real diagonals, where N is a number of symbols in a leaf-node candidate, and where q and p are non-zero real numbers selected to minimize complexity.

2. The system of claim 1, wherein the leaf node predictor uses a two-dimension leaf-node predictor recursively at least N−1 times and wherein the dimension refers to the number of transmitted symbols.

3. The system of claim 1, wherein the leaf node predictor uses a look-up table listing instructions corresponding to best leaf node candidates for a given channel metric.

4. The system of claim 1, wherein the two-dimension leaf node predictor generates the instructions corresponding to best leaf node candidates for a given channel metric analytically without an instruction look-up table.

5. The system of claim 1, further comprising a MIMO engine.

6. The system of claim 1, wherein the leaf node predictor generates at least one instruction to output by optimizing a probability that the output contains at least a suitable approximation of a channel input with lowest cost.

7. The system of claim 1, further comprising a MIMO engine for enumerating at least one candidate vector corresponding to an at least one best leaf node candidate.

8. The system of claim 7, wherein interference cancellation is used to enumerate the at least one candidate vector.

9. The system of claim 7, wherein the MIMO engine computes a cost of each best leaf node candidate.

10. The system of claim 7, further comprising a decoder for computing log-likelihood ratio values from the at least one candidate vector.

11. The system of claim 1, further comprising a wireless receiver for receiving a stream of information.

12. The system of claim 1, wherein the leaf node predictor further performs at least one of the following decompositions prior to calculating the channel metric: QR decomposition, Cholesky decomposition, and singular-value decomposition.

13. The system of claim 1, wherein at least two instructions of the at least three instructions are generated by inference from the remaining at least one instruction.

14. The system of claim 1 wherein:
a first instruction corresponds to at least one predicted best leaf node candidate for the given channel realization;
a second instruction is a vector of numbers; and
a 3rd instruction is a set of vectors.

15. A multiple-input multiple-output (MIMO) detection system, comprising:
a leaf node predictor for receiving a processed communications stream, determining at least one channel metric, which is a function of a matrix, corresponding to the communications stream for a given channel realization, and generating at least three instructions to output including at least one vector, wherein the leaf node predictor determines the at least one channel metric, $m_i$, such that $$m_i = \left( \frac{\|\tilde{h}_i\|^q}{\min_{k=i+1\ldots N} \left(\|\tilde{h}_k\|^q\right)} \right)^p,$$

where $\tilde{h}_k$ is the k-th column of HΠ, H is an M×N channel matrix, Π is an N×N permutation matrix, where N is a number of symbols in a leaf-node candidate, M is an integer, and where q and p are non-zero real numbers selected to minimize complexity.

16. The system of claim 15, wherein the leaf node predictor uses a two-dimension leaf-node predictor recursively at least N−1 times, where N is a number of symbols in a leaf-node candidate, wherein the dimension refers to the number of transmitted symbols.

17. The system of claim 15, wherein the leaf node predictor uses a look-up table listing instructions corresponding to best leaf node candidates for a given channel metric.

18. The system of claim 15, wherein the leaf node predictor is two dimensional and the two-dimension leaf node predictor generates the instructions corresponding to best leaf node candidates for a given channel metric analytically without an instruction look-up table.

19. The system of claim 15, further comprising a MIMO engine.

20. The system of claim 15, wherein the leaf node predictor generates at least one instruction to output by optimizing a probability that the output contains at least a suitable approximation of a channel input with lowest cost.

21. The system of claim 15, further comprising a MIMO engine for enumerating at least one candidate vector corresponding to an at least one best leaf node candidate.

22. The system of claim 21, wherein interference cancellation is used to enumerate the at least one candidate vector.

23. The system of claim 21, wherein the MIMO engine computes a cost of each leaf node candidate.

24. The system of claim 21, further comprising a decoder for computing log-likelihood ratio values from the at least one candidate vector.

25. The system of claim 15, further comprising a wireless receiver for receiving a stream of information.

26. The system of claim 15, wherein the leaf node predictor further performs at least one of the following decompositions prior to calculating the channel metric: QR decomposition, Cholesky decomposition, and singular-value decomposition.

27. The system of claim 15, wherein at least two instructions of the at least three instructions are generated by inference from the remaining at least one instruction.

28. A multiple-input multiple-output (MIMO) detector, comprising:
a leaf-node predictor which generates, without using an instruction look-up table, at least three instructions directly from a channel metric which is a function of a matrix, and outputs the at least three instructions to a MIMO engine including at least one vector, wherein the leaf node predictor determines the at least one channel metric, $m_i$, such that $$m_i = \left( \frac{R_{i,i}^q}{\min_{k=i+1\ldots N} (R_{k,k}^q)} \right)^p,$$

where R is an N×N triangular matrix with positive and real diagonals, where N is a number of symbols in a leaf-node candidate, and where q and p are non-zero real numbers selected to minimize complexity.

29. The detector of claim 28, wherein at least two instructions of the at least three instructions are generated by inference from the remaining at least one instruction.

30. The detector of claim 28, wherein the leaf node predictor uses a two-dimension leaf-node predictor recursively at least N−1 times, where N is a number of symbols in a leaf-node candidate, wherein the dimension refers to the number of transmitted symbols.

31. The detector of claim 28, wherein the leaf node predictor further calculates at least one of the following decompositions prior to calculating the channel metric: QR decomposition, Cholesky decomposition, and singular-value decomposition.

32. The detector of claim 28 wherein:
a first instruction corresponds to at least one predicted best leaf node candidate for the given channel realization;
a second instruction is a vector of numbers; and
a 3rd instruction is a set of vectors.

33. A multiple-input multiple-output (MIMO) detector, comprising:
a leaf-node predictor which generates, without using an instruction look-up table, at least three instructions directly from a channel metric which is a function of a matrix, and outputs the at least three instructions to a MIMO engine including at least one vector, wherein the leaf node predictor determines the at least one channel metric, $m_i$, such that $$m_i = \left( \frac{\|\tilde{h}_i\|^q}{\min_{k=i+1\ldots N} \left(\|\tilde{h}_k\|^q\right)} \right)^p,$$

where $\tilde{h}_k$ is the k-th column of HΠ, H is an M×N channel matrix, Π is an N×N permutation matrix, where N is a number of symbols in a leaf-node candidate, M is an integer, and where q and p are non-zero real numbers selected to minimize complexity.

34. The detector of claim 33, wherein at least two instructions of the at least three instructions are generated by inference from the remaining at least one instruction.

35. The detector of claim 33, wherein the leaf node predictor uses a two-dimension leaf-node predictor recursively at least N−1 times, where N is a number of symbols in a leaf-node candidate, wherein the dimension refers to the number of transmitted symbols.

36. The detector of claim 33, wherein the leaf node predictor further calculates at least one of the following decompositions prior to calculating the channel metric: QR decomposition, Cholesky decomposition, and singular-value decomposition.

* * * * *